United States Patent [19]

Sindel

[11] Patent Number: 4,539,464
[45] Date of Patent: Sep. 3, 1985

[54] JOINING PARALLEL FACES OF THICK-WALLED STRUCTURES BY ARC WELDING

[75] Inventor: Allen W. Sindel, Biloxi, Miss.

[73] Assignee: Combustion Engineering, Inc., Windsor, Conn.

[21] Appl. No.: 526,941

[22] Filed: Aug. 29, 1983

[51] Int. Cl.$^3$ .............................................. B23K 9/02
[52] U.S. Cl. ................................. 219/137 R; 219/126
[58] Field of Search ............... 219/136, 137 R, 125.12, 219/126

[56] References Cited

U.S. PATENT DOCUMENTS

| 1,643,227 | 9/1927 | Stresau | 219/137 R |
| 1,995,546 | 3/1935 | Meier | 219/137 R |
| 3,511,960 | 5/1970 | De Haeck | 219/137 R |

*Primary Examiner*—Roy N. Envall, Jr.
*Assistant Examiner*—Alfred S. Keve
*Attorney, Agent, or Firm*—Arthur L. Wade

[57] ABSTRACT

The parallel faces of thick-walled structures to be joined by arc welding are provided an electrically conductive metallic support along and up into the bottom of a gap between the parallel walls for the initial pass of the arc. The metallic support is subsequently gouged from the gap and the union of the parallel faces is completed by filling the gouged space with welding material.

1 Claim, 1 Drawing Figure

U.S. Patent   Sep. 3, 1985   4,539,464
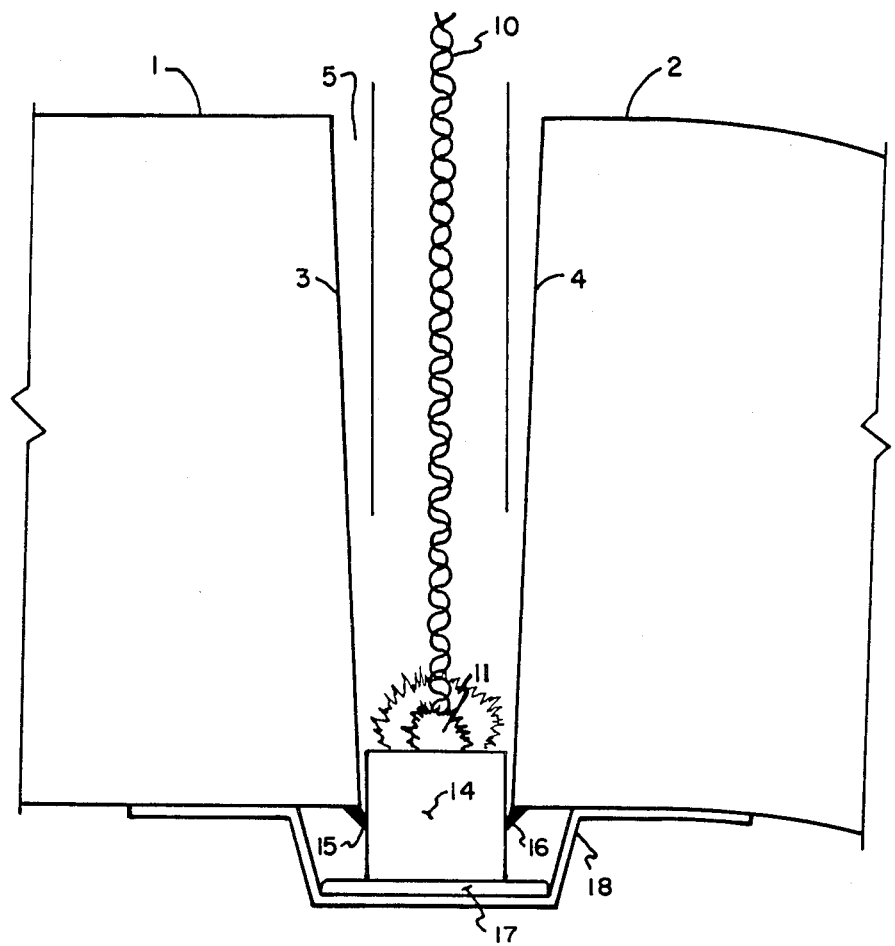

JOINING PARALLEL FACES OF THICK-WALLED STRUCTURES BY ARC WELDING

TECHNICAL FIELD

The present invention relates to joining thick-walled structures by arc welding in the gap formed by parallel faces of the structures. More particularly, the invention relates to providing an electrically conductive mechanical structure as a bottom to the gap formed by the vertical and parallel walls which will accept the initial pass of the welding electrode and form a foundation for completing the weld.

BACKGROUND ART

Apparently, the twist-wire electrode welding machine, marketed by Kobe Steel, Ltd. of Japan, performs brilliantly. Great hopes are pinned on this machine to revolutionize the welding art. All the advantages and limitations of this arc welding machine, and the technique for using it, need not be explored in this disclosure. Apparently, the twist-wire electrode oscillates the arc in the gap formed by the faces of the structures being joined. At least one satisfactory expectation is the elimination of the huge "V"-shaped gap formed by beveling the opposed faces of structures to be joined. Tremendous amounts of weld metal are presently tediously laid down in the "V"-shaped gap to join thick-walled structures. Now, the oscillating arc of the consumed twist-wire electrode distributes the weld metal uniformly between the walls held to a narrow distance apart. However, there is a problem of providing a "bottom" or floor in the narrow gap which will be both electrically conductive and mechanically supportive of the initial pass of the twist-wire electrode.

Obviously, as arc welding is utilized, the structure providing the floor of the gap must be electrically conductive to sustain the arc. At the same time, the mechanical integrity of the bottom or floor structure must be maintained when subjected to the elevated temperature of the welding process. Not only must electrical current between the consumable electrode and work piece be sustained, but the molten metal of the welding bead must be retained by this bottom structure of the gap. In short, the bottom of the gap must be electrically conductive and leakproof.

DISCLOSURE OF THE INVENTION

The present invention contemplates an electrically conductive support structure in the form of an elongated metallic bar partially inserted up along the length of the gap formed between two vertical and parallel surfaces of thick-walled structures which will sustain the arc and militate against leakage of molten metal from the gap.

The invention further contemplates adhering a structure to the bottom of the elongated metallic bar which will first conduct enough of the heat of the welding process to prevent the bar being melted, and secondly, to insure a fluid seal against the escape of molten metal as the deposit is created and laid down in the gap above the bar.

The invention further contemplates that the heat sink and barrier structure is an appropriate form of ceramic adhered into place below the elongated metallic bar by adhesive backing material bridging across the gap of the faces being welded together.

Other objects, advantages and features of this invention will become apparent to one skilled in the art upon consideration of the written specification, appended claims, and attached drawing.

BRIEF DESIGNATION OF THE DRAWING

The drawing is a cross section elevation of two thick walled structures whose vertical and parallel faces have been brought close enough to form a gap having a floor embodying the present invention.

BEST MODE FOR CARRYING OUT THE INVENTION

Terms and Technology

The present invention has been reduced to practice by welding thick walls of hemispherical heads onto the ends of cylinders in the fabrication of vessels. Therefore, the "bodies" joined by the weld are embodied in these heads and cylinders. It is contemplated that the thickness of these walls with which the invention is reduced to practice will be in the order of three to four inches and that the welding be completed as the walls are held vertical and parallel to each other to form a gap in the order of one-half inch. It would appear that the arc of the welding process will be initially generated at the bottom of this one-half inch gap and that the structure embodying the present invention will be described as being located at the bottom of the gap with the welding passes being completed as the gap is filled toward its top. It is strongly emphasized that the dimensions of the walls and the gap are by no means limiting in defining the present invention.

The problem solved by the invention is associated with that first pass of the arc welding carried out at or near the bottom of the gap. Great economy can be expected by providing only a straight-sided gap, as opposed by the V-shaped gap. Apparently, the twist wire electrode of the new Japanese welding machine oscillates its arc efficiently between the two parallel surfaces of the narrow gap. However, it is that initial pass of the electrode to form a bridge of weld material between the two vertical faces which requires the present invention. Not only must electrical conductivity be provided for the arc, but a leakproof cavity must be formed at the lower end of the gap to retain the molten welding metal initially laid down.

It will be logically inferred from the teachings of the prior art that some form of metallic plate, thick enough to function as a floor to the gap, could be clamped to bridge across the bottom of the gap. However, this can be a cumbersome arrangement compared with the light, readily-worked, longitudinal, cold-rolled steel backup bar contemplated as embodying the present invention. This backup bar can be extended longitudinally across the bottom of the gap with any convenient cross-sectional shape and extended upward into the bottom of the gap to function as a spacer between the parallel faces to be joined by the arc welding.

The Invention In Terms Of Structure

In the drawing, wall 1 and wall 2 are indicated as having a vertical thickness in the order of 3 to 4 inches. Face 3 of wall 1 and face 4 of wall 2 are positioned to form gap 5, having a width in the order of one-half inch. Faces 3 and 4 are oriented vertically and, therefore, gap 5 is vertical with the welding electrode extended down into the gap from above, and the structure embodying the present invention positioned at the bottom of the gap.

Twist-wire electrode 10 is depicted as extending down into gap 5 from its welding machine not shown. The arc between the lower ends of electrode 10 and the wall faces is indicated at 11.

An elongated metallic backup bar 14 is shown in cross section as extending the length of the gap. Further, bar 14 is extended up into the lower end of gap 5 as a part of the floor or closure for the gap. The cross section of bar 14 indicates it is specifically rectangular; however, obviously, it could take other cross-sectional shapes and function as intended in this embodiment of the invention. In any event, the body of bar 14 bridges across the lower ends of faces 3 and 4 to, hopefully, form a leakproof bottom for gap 5. To secure the bar into place, it is tack welded at 15 and 16.

With bar 14 tack welded into place, the bar becomes a spacer which holds the work in rigid relationship while the union of faces 3 and 4 is completed by the welding process. An additional function of the bar is to form an electrically conductive body at the bottom of gap 5 so that the circuit between the vessel walls and the end of electrode 10 may be completed. It should now be apparent that bar 14 functions electrically as a conductor for the welding process and structurally as a leakproof support for that first pass of the welding electrode.

The heat maintained at arc 11 is great enough to fluidize the material of electrode 10 and form a bead of molten metal as a bridge between faces 3 and 4. This molten metal in the area of arc 11 transfers enough heat to the body of bar 14 to possibly melt the bar and raise the danger of actually burning through the body of the bar. Of course, should this melting of the bar occur, the molten welding metal from the electrode will be lost from gap 5 and fail to function as an effective bridge between faces 3 and 4 and a foundation for subsequent passes which will complete the weld to the upper end of gap 5. To prevent the structural failure of bar 14, a structure is provided on its lower surface which will prevent burn-through of the bar, and leakage of the molten weld metal from gap 5.

In the drawing, a conductive, leakproof support structure is completed by attaching body 17 to the lower surface of bar 14. Body 17 may be ceramic and is held in position by tape 18 which extends from the undersurface of wall 1 to the undersurface of wall 2. An embodiment of tape 18, including body 17, is commercially available which will adequately reinforce bar 14, act as a heat sink to protect the bar from burn-through, and act as a leakproof support structure.

In summation, whatever the prior art discloses in the form of a support body below gap 5, the present invention advances the concept of a backup bar 14 which can be readily manipulated into position by a worker to function electrically and structurally to ensure that the initial welding pass by electrode 10 lays down the foundation bead at the lower length of gap 5. Once the initial bead of welding metal is effectively completed above backup bar 14, gap 5 can be leisurely filled by subsequent passes of electrode 10 until the upper end of gap 5 is reached. Subsequently, to give the integrity of uniformity to the weld union between faces 3 and 4, the body of bar 14 can be gouged from its position and electrode welding metal run in its place up to the lower faces of walls 1 and 2.

The Invention In Process Terms

Utilizing the structure of the drawing as a guide, the invention can be defined as positioning the vertical faces of two walls to form a gap between them. An electrically conductive structural support body can be positioned along the length of the lower end of the gap and tack welded to the faces of the walls. A heat sink and seal body is adhered to the lower surface of the conductive structure between the wall faces and the first pass of an electrode lays down an initial, bridging bead between the parallel faces above the support structure. The support structure can then be removed and replaced by welding to complete the weld body between the faces of the walls.

Conclusion

Structurally, an essential element of the invention is embodied in backup bar 14. Conceived as having the dimensions which give it enough lightness for ready manipulation up into the lower length of gap 5 by a minimum of workmen, this bar becomes a spacer holding faces 3 and 4 in their proper parallel relationship, an electrical conductor to sustain the welding arc, and a leakproof bottom for gap 5 to prevent the escape of the weld material while it is in the molten state. With the lightness of construction which provides ready manual manipulation, bar 14 will be fragile enough to require backup. Not only will there be the possibility of leaking cracks or fissures between the sides of the bar and the vertical faces it bridges, but the heat of the welding arc could quite literally burn through and destroy the integrity of the body of the bar as an effective seal along the bottom of gap 5. Therefore, an additional backup element is required.

Body 17 is positioned along the lower surface of bar 14 to complete the fluid-tight seal of the embodiment of the invention. It has been found that ceramic bodies 17 are commercially provided longitudinally along adhesive strip 18 for this service. This welding tape can adhere to the surface of walls 1 and 2. When bar 14 and backup body 17 are placed in the position shown in the drawing, a bottom is provided for gap 5 which will both sustain an electrical arc and retain the molten welding bead as it is initially run above the upper surface of bar 14. Of course, the junction between faces 3 and 4 is completed by subsequent passes of electrode 10, gouging bar 14 from its position, and substituting weld material for the bar.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. An arc welding process for joining the walls of two bodies, including,
    forming a vertical gap between the walls of the bodies to be joined, positioning an elongated metallic structure along the length of the gap and up into the bottom of the gap, tack welding the elongated metallic structure into place, supporting and sealing the lower surface of the elongated structure with a support body positioned on the lower face of the elongated structure, arc welding between the two walls forming the gap above the elongated structure and its support body until the gap is filled, and gouging the elongated structure from the gap and completing the union between the two bodies by filling the gouged space of the gap with welding material.

* * * * *